Patented Apr. 2, 1940

2,196,016

UNITED STATES PATENT OFFICE 2,196,016

WATER-SOLUBLE BASIC ALUMINUM COMPOUNDS

Werner Huehn and Walfried Haufe, Ludwigshafen-on-the-Rhine, Germany, assignors to I. G. Farbenindustrie Aktiengesellschaft, Frankfort-on-the-Main, Germany No Drawing. Application January 22, 1938, Serial No. 186,303. In Germany January 25, 1937

5 Claims. (Cl. 23—50)

The present invention relates to the production of basic aluminum compounds which are truly or colloidally soluble in water.

It is already known that by the peptization of aluminum hydroxide gel, which is freshly precipitated with ammonia and not washed for too long a period, with small amounts of hydrochloric acid there are formed aluminum oxychlorides of the composition $Al(OH)Cl_2$ and $Al(OH)_2Cl$ or AlOCl, but by the said method only very dilute solutions of the said oxychlorides containing only from 0.3 to 2.8 grams of $Al_2O_3$ per litre can be obtained. Upon attempting to prepare stronger solutions, there are obtained at a content of more than 3.0 grams of $Al_2O_3$ per litre not clear solutions but only strongly opalescent dispersions.

By dissolving aluminum in comparatively small amounts of very dilute hydrochloric acid in the presence of large amounts of mercury, sols or solutions can also be obtained in which, according to a potentiometrical investigation, aluminum hydroxo cations $$AlOH\cdot\cdot \text{ or } Al(OH);$$

are probably present. The extremely weak solutions thus obtained are only stable and clear as long as the atomic ratio between aluminum and chlorine remains below 1; solid basic aluminum compounds cannot be prepared therefrom. The sols are very cloudy at a greater atomic ratio.

It is also known that by the action of weak solutions of aluminum nitrate, chloride or sulphate on metallic aluminum in the presence of certain heavy metal salts there are formed basic aluminum salts which are difficultly soluble or insoluble in water.

We have now found that basic aluminum compounds which are truly or colloidally soluble in water, and in particular soluble highly-colloidal aluminum oxide sols are obtained in a simple manner by dissolving metallic aluminum in aqueous solutions of normal to at the most weakly basic aluminum salts, at elevated temperature, but avoiding the boiling of the liquid for a long time, the aluminum content, calculated as $Al_2O_3$, of the solutions to be used being at least 5 grams per litre. Otherwise the formation of the desired compounds is rendered difficult or quite impossible. It is preferable to use solutions containing 8 grams or more of $Al_2O_3$ per litre. The addition of catalysts, such as mercury or heavy metal salts, is unnecessary. The aluminum dissolves with evolution of hydrogen and without the formation of insoluble compounds and there is formed an entirely water-clear, pale, nonopalescent liquid. In the said manner for example 11 atoms of metallic aluminum may be converted into a clear solution with 1 molecular proportion of aluminum chloride in a 25 per cent aqueous solution. This is the more surprising having regard to the fact that when using weak solutions in the presence of mercury it is impossible to dissolve more than 4.5 atoms of aluminum in 1 molecule of aluminum chloride to give a clear solution without opalescence.

By evaporating the reaction liquids there are obtained white dry products which dissolve in water to give clear solutions without opalescence. The evaporation is preferably carried out in vacuo. By boiling the products for a very long time at ordinary pressure, the water-solubility of the products is lost. All water-soluble salts of aluminum may be used for the new process according to the present invention, as for example, aluminum chloride, bromide, iodide, fluoride, nitrate, acetate, formate and, for weakly basic hydroxy compounds, even the sulphate. When using aluminum nitrate, a part of the nitric acid is reduced by the hydrogen formed and by using the same amount of metallic aluminum solutions or sols of higher basicity are obtained than with other salts.

Instead of ready-made aluminum salts, there may also be used an amount of free acid or acid salt corresponding to the desired basic compound. Therefore aluminum may be treated with such amounts of an aqueous acid which is capable of forming a water-soluble aluminum salt, as are insufficient for dissolving the aluminum amount in the form of a non-basic aluminum salt.

The temperature during the reaction may be selected between 35° C. and the boiling temperature of the solution; the physical and chemical properties of the products are somewhat different depending on the height of the temperature. It is especially recommended that the reaction be carried out between about 70° and about 80° C. because then products which are soluble to give clear solutions are obtained with certainty even when highly colloidal aluminum oxides are prepared; at considerably higher temperatures their solutions tend to become cloudy and flocculate out.

Aluminum oxychlorides comparatively rich in chlorine, as for example $(Al(OH)_2Cl$. yield with sodium sulphate in aqueous solution a granular precipitate in which respect they differ from the high molecular aluminum hydroxide sols which yield a slimy precipitate.

Basic oxychlorides prepared according to the present invention are eminently suitable for tawing, especially those of relatively weak basicity. The basic salts, especially those which are more strongly colloidal, may also be used as initial materials for the preparation of adsorbents, as catalysts and also in the paper and pharmaceutical industries.

The following examples will further illustrate the nature of this invention but the invention is not restricted to these examples. The parts are by weight.

*Example 1*

242 parts of crystallized aluminum chloride are dissolved in 1000 parts of water and then 27 (or 54, 81, 135, 189 or 270) parts of aluminum grit, chips or bars are added. The whole is heated on the waterbath or by leading in steam until complete dissolution of the aluminum has taken place, filtered and evaporated to dryness in vacuo. A white powder is obtained which dissolves in water to give a clear solution and in which the atomic ratio of chlorine to aluminum is 3:2 (or 1:1, 3:4, 1:2, 3:8 or 3:11).

*Example 2*

375 parts of crystallized aluminum bromide are dissolved in 1000 parts of water and then 27 parts of aluminum powder are added. After heating until the aluminum has completely dissolved, the solution is filtered and evaporated to dryness in vacuo. A powder soluble in water is obtained in which the atomic ratio of bromine to aluminum is 3:2.

*Example 3*

516 parts of crystallized aluminum iodide are dissolved in 1000 parts of water and 27 parts of aluminum powder are added. After the aluminum has completely dissolved on a waterbath, the whole is filtered and dried in vacuo. A powder soluble in water is obtained in which the atomic ratio of iodine to aluminum is 3:2.

*Example 4*

375 parts of crystallized aluminum nitrate are dissolved in 1000 parts of water and 27 (or 135) parts of aluminum powder or chips are added. The whole is heated until the aluminum has completely dissolved and the solution filtered and evaporated to dryness in vacuo. A powder soluble in water is obtained.

*Example 5*

666 parts of crystallized aluminum sulphate are dissolved in 1000 parts of water and 27 parts of aluminum powder are added. The whole is heated until the aluminum has completely dissolved, the solution is filtered and evaporated to dryness in vacuo. A powder is obtained in which the ratio of $SO_4''$ to $Al\cdots$ is 1:1.

*Example 6*

100 parts of freshly precipitated well washed aluminum oxide are dissolved in 476 parts of 30 per cent hydrochloric acid by leading in steam. To the filtered solution 162 parts of comminuted aluminum are added. By heating the liquid on a waterbath a colloidal solution is obtained in which the atomic ratio of chlorine to aluminum is 1:2. Evaporation to dryness in vacuo yields a white powder which is completely soluble in water.

*Example 7*

1000 parts of aluminum powder are added to 1740 parts of hydrochloric acid (specific weight 1.152) which has been diluted with 3000 parts of water. By leading steam into the liquid the reaction is started. After the aluminum has completely dissolved the solution is filtered and evaporated to dryness in vacuo. A white powder is obtained which is completely soluble in water and which contains chlorine and aluminum in an atomic ratio of 1:2.

What we claim is:

1. The process of producing stable water-soluble basic aluminum compounds which comprises dissolving in an aqueous solution of an aluminum salt selected from the class consisting of aluminum nitrate and the aluminum halides, the aluminum content of which solution corresponds to at least 5 grams $Al_2O_3$ per liter, at elevated temperature at least the same amount of metallic aluminum which is contained in salt-form in the solution, boiling of the liquid for a long time being avoided.

2. The process of producing stable water-soluble basic aluminum compounds which comprises dissolving in an aqueous solution of an aluminum salt selected from the class consisting of aluminum nitrate and the aluminum halides, the aluminum content of which solution corresponds to at least 8 grams $Al_2O_3$ per liter, at elevated temperature at least the same amount of metallic aluminum which is contained in salt-form in the solution, boiling of the liquid for a long time being avoided.

3. The process of producing stable water-soluble basic aluminum compounds which comprises dissolving in an aqueous solution of an aluminum salt selected from the class consisting of aluminum nitrate and the aluminum halides, the aluminum content of which solution corresponds to at least 5 grams $Al_2O_3$ per liter, at least the same amount of metallic aluminum which is contained in salt-form in the solution, at temperatures between 35° C. and the boiling temperature of the liquid.

4. The process of producing stable water-soluble basic aluminum compounds which comprises dissolving in an aqueous solution of an aluminum salt selected from the class consisting of aluminum nitrate and the aluminum halides, the aluminum content of which solution corresponds to at least 5 grams $Al_2O_3$ per liter, at least the same amount of metallic aluminum which is contained in salt-form in the solution at temperatures of about from 70 to 80° C.

5. The process of producing stable water-soluble basic aluminum compounds which comprises dissolving in an aqueous solution of an aluminum salt selected from the class consisting of aluminum nitrate and the aluminum halides, the aluminum content of which solution corresponds to at least 5 grams $Al_2O_3$ per liter, at least the same amount of metallic aluminum which is contained in salt-form in the solution at temperatures of between 35° C. and the boiling point of the liquid and evaporating the solution obtained to dryness in vacuo.

WERNER HUEHN.
WALFRIED HAUFE.